Nov. 5, 1968  E. VILLARREAL PANTOJA  3,408,968

WASTE INCINERATOR

Filed Feb. 13, 1967  6 Sheets-Sheet 1

INVENTOR
ERNESTO VILLARREAL PANTOJA

Nov. 5, 1968   E. VILLARREAL PANTOJA   3,408,968
WASTE INCINERATOR

Filed Feb. 13, 1967   6 Sheets-Sheet 3

INVENTOR
ERNESTO VILLARREAL PANTOJA

Nov. 5, 1968  E. VILLARREAL PANTOJA  3,408,968
WASTE INCINERATOR
Filed Feb. 13, 1967  6 Sheets-Sheet 4

Fig. 5.

INVENTOR
ERNESTO VILLARREAL PANTOJA

United States Patent Office 3,408,968
Patented Nov. 5, 1968

3,408,968
WASTE INCINERATOR
Ernesto Villarreal Pantoja, Rio Nilo 23-A,
Mexico City 5, Mexico
Filed Feb. 13, 1967, Ser. No. 615,520
Claims priority, application Mexico, Sept. 9, 1966,
91,032
9 Claims. (Cl. 110—12)

ABSTRACT OF THE DISCLOSURE

A waste incinerator comprising a radially symmetric double-walled housing, the outer walls of said housing comprising bores adjacent the lower and upper ends to allow circulation of cool air through the gaps between the outer and the inner walls. A plurality of grates are arranged around a vertical post such that all the grates together will span the entire cross section of the housing. The central post has a blunt pointed upper end to distribute the wastes charged from the top, and a plurality of ventilating channels to feed air toward the grates. A charging system for waste is provided above the upper mouth of the housing and a plurality of tangentially arranged bores accommodate the guns of the necessary burners, said bores being arranged above the first or lowermost grate.

---

The present invention refers to the disposal of all types of wastes and, more particularly, it relates to an incinerator capable of a great capacity, for the incineration of large amounts of garbage such as those generated in municipal entities, groups of buildings and manufacturing premises.

The problems involved in the collection and disposal of garbage from large cities are very well known and heretofore an efficient incinerator which may be able to effectively dispose of lareg amounts of wastes has not been designed. Thus, in many cities it becomes necessary to form large garbage depositing fields with the aim of transforming said garbage by special and costly yeasts into "humus" for further utilization thereof as a fertilizer. This operation, however, may be said to be still in the experimental stage and does not constitute the most efficient means for disposing of large amounts of the garbage and wastes. Alternatively, the garbage is just left in the fields with the consequent unhealthly conditions developed thereby.

In places where large water streams pass, it is preferred to dump said large amounts of garbage to be carried by said streams, with the consequent contamination thereof and the impossibility of using the water for applications other than the mere fertilization of crop lands.

In many places of the world it is preferred to dispose of the garbage by the use of conventional incinerators which involve numerous drawbacks, such as a very low efficiency of incineration, very large amounts of fuel consumed, incomplete incineration of the wastes introduced therein with the consequent production of partially burned wastes which are withdrawn by the draft of the chimney thereby constituting a nuisance all around the neighborhood, and other effects of this type.

When a battery of incinerators of the above mentioned nature has been installed for the disposal of large amounts of garbage, such as those generated in a municipal entity or city, it has become necessary to provide considerably large numbers of incinerators of small or medium size to form a battery, because the incinerators known heretofore, when built on a considerably large size, do not have an efficient performance and the extraordinarily hot flame which must be introduced to achieve the most complete incineration possible, creates such a high temperature in predetermined sites of the equipment that the refractory materials used as flame barriers or as hearths are damaged such that replacement is very frequently necessary and therefore a battery of incinerators suitable for incinerating very large amounts of wastes such as from cities, groups of buildings or large manufacturing premises cannot be designed to perform efficiently with a conventional type of apparatus.

Due to the inefficiency of prior art incinerators when used for the incineration of large amounts of garbage, the use of batteries of said incinerators produces the exhaustion of unduly large amounts of smoke, ashes, and partially burned wastes so that it becomes necessary to install the batteries of this type of incinerators in uninhabited places. On the other hand, as the inefficient combustion of large amounts of garbage in this type of incinerators generarly creates the expulsion of noxious gases through the doors and through any slit in the walls of the incinerators, which becomes dangerous to the operators of the incinerator, it also becomes necessary, in order to avoid the use of gas-masks or the like, to install this type of incinerators completely outside of any building, with the consequent disadvantage that the operation of the incinerator will be subject to the weather conditions, it being impractical to allow this drawback in an operation devoted to the incineration of large amounts of garbage which are being continuously produced and which therefore must be disposed of in an efficient and continuous manner.

Finally, it can also be mentioned that prior art incinerators which sometimes are used for the incineration of large amounts of garbage and wastes, such as those from cites and the like, are provided with a grate system offering the possibility of taking advantage of all the heat from the combustion gases from the burners and providing suitable conditions to completely burn the garbage without the production of appreciable amounts of partially burned materials or ashes going out of the chimney and constituting a nuisance to the neighborhood. In many prior art incinerators there has not been provided heretofore any device for stopping partially burned materials and to avoid its entrainment in the flue gases, and therefore the performance of said incinerators can be considered as very inefficient and quit inadequate for the incineration of large amounts of garbage, including dead animals, regardless of size.

Having in mind the defects of the prior art incinerators for achieving an efficient incinerating action when used in connection with large amounts of wastes, it is an object of the present invention to provide an incinerator capable of a very large capacity, and which will be suitable for its installation within a building, either alone or forming part of a battery thereof, without thereby constituting a danger to the operators because of the undesirable production of gases and smoke flowing through the charging doors and the like.

It is a further object of the present invention to provide an incinerator of the above character which will comprise means for stopping partially burned materials or ashes in order to avoid the exhaustion thereof through the chimney.

Another object of the invention is to provide an incinerator of the above character which will comprise very efficient charging means, suitable for the reception of complete truckloads and having sealing devices to avoid the escape of smoke or vapors through the charging means.

A further and more particular object of the invention is to provide a large capacity incinerator of the above mentioned character which will comprise a plurality of grates arranged such that the optimum use of the heat from the burner gases is achieved, and which will offer the possibility of effecting an automatic distribution of the load at the various levels of the incinerator without the need of individually charging each chamber and yet providing a gas flow which will not tend to unduly entrain partially burned materials or ashes toward the chimney.

A further and additional object of the invention is to provide an incinerator of the above mentioned character which will comprise facilities for the charging of garbage directly from trucks without the need of intermittently transporting said garbage between the trucks and the incinerator.

Another object of the invention is to provide an incinerator of the above mentioned nature which will comprise means for effectively cooling the inner walls and other elements thereof so as to avoid early damage to their refractory materials.

Another object of the invention is to provide an incinerator having an enclosure designed such that it will enable the same to be arranged in batteries of two or more, with a minimum of space requirements and with the possibility that all of them may be connected to the same chimney or draft.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, in which:

Having now more particular reference to the drawings, and more specifically to FIGS. 1 through 7 thereof, there is illustrated an incinerator capable of a very large capacity of incineration and generally comprising a housing 10 built in supported relationship to a frame 27 such as of concrete, steel or the like, and brick walls 13 and 14, which walls can be covered by a metal sheet without thereby departing from the scope of the invention. While the shape of the housing 10 can be varied, it is generally preferred to provide a circular or polygonal cross section, such as an hexagonal cross section, and in the illustrative drawings the hexagonal shape has been exemplified, since this shape is the one which is most adequate for the installation of the incinerators in batteries working together with a common flue duct or chimney for effecting the incineration of the garbage and wastes in very large capacities, such as those required for the disposal of garbage from cities and the like.

Figure 1:
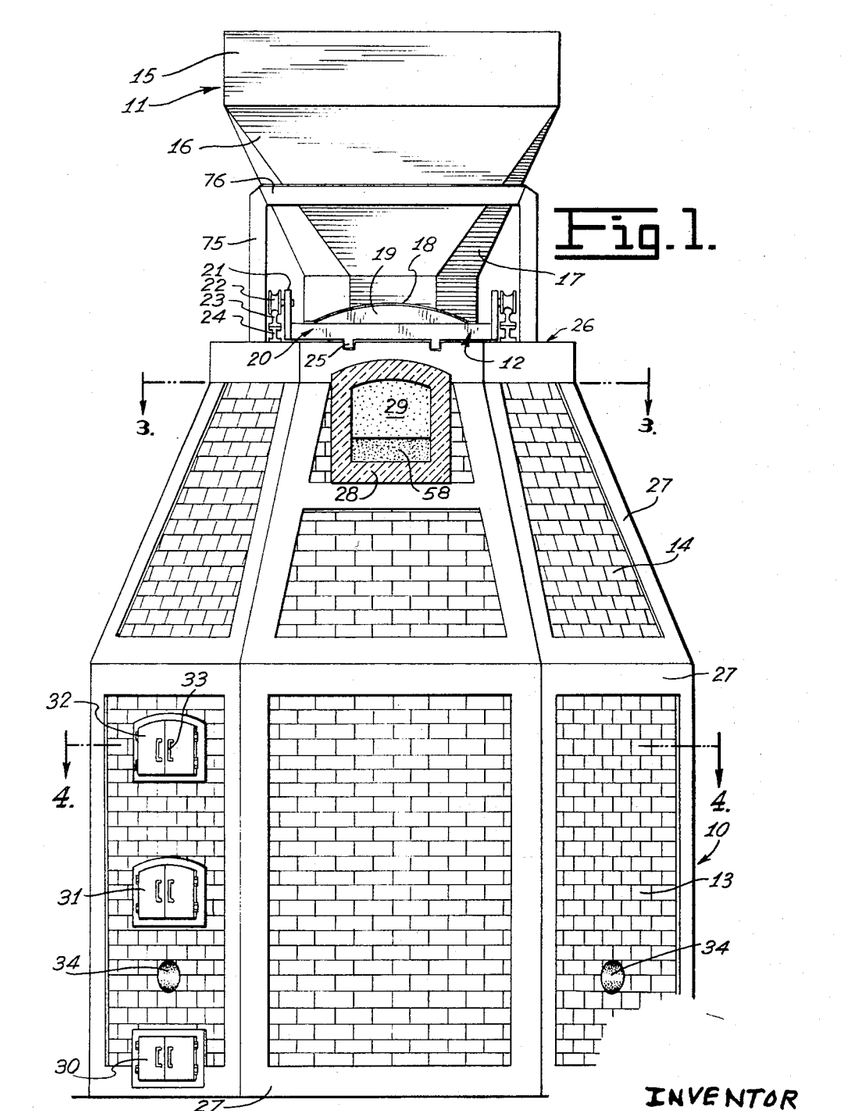
FIG. 1 is an elevational view of an incinerator built in accordance with the present invention, with the duct for connection thereof to the chimney shown in cross section to illustrate inner details thereof.
Figure 2:
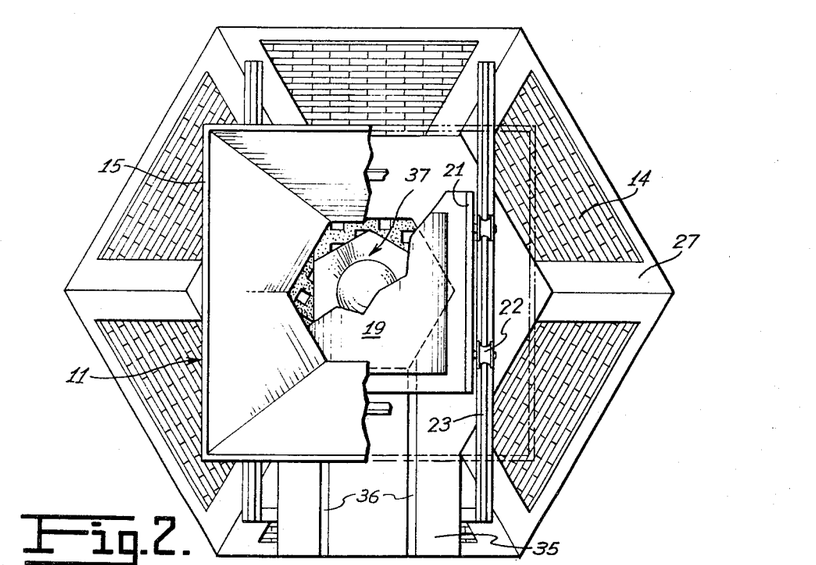
FIG. 2 is a top plan view of the incinerator of the present invention, with the charging means partially broken away to show inner details.
Figure 3:
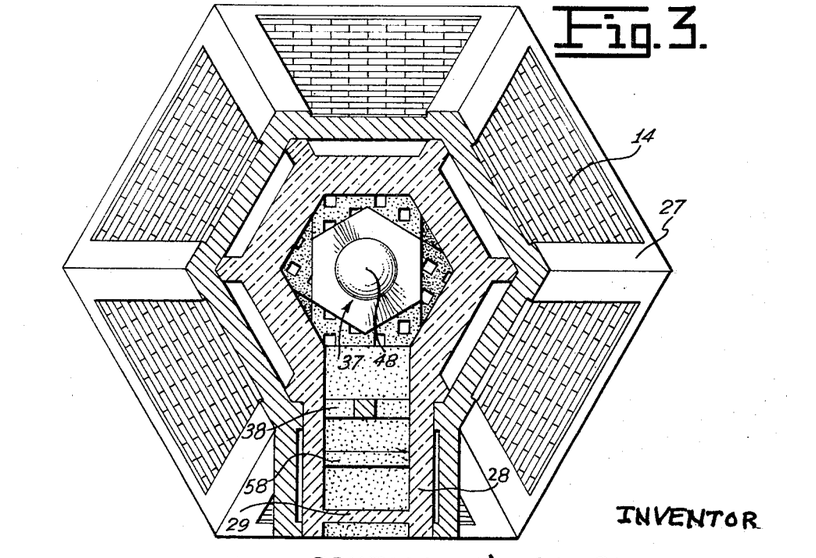
FIG. 3 is a cross sectional view taken along lines 3—3 of FIG. 1 and looking in the direction of the arrows.
Figure 5:
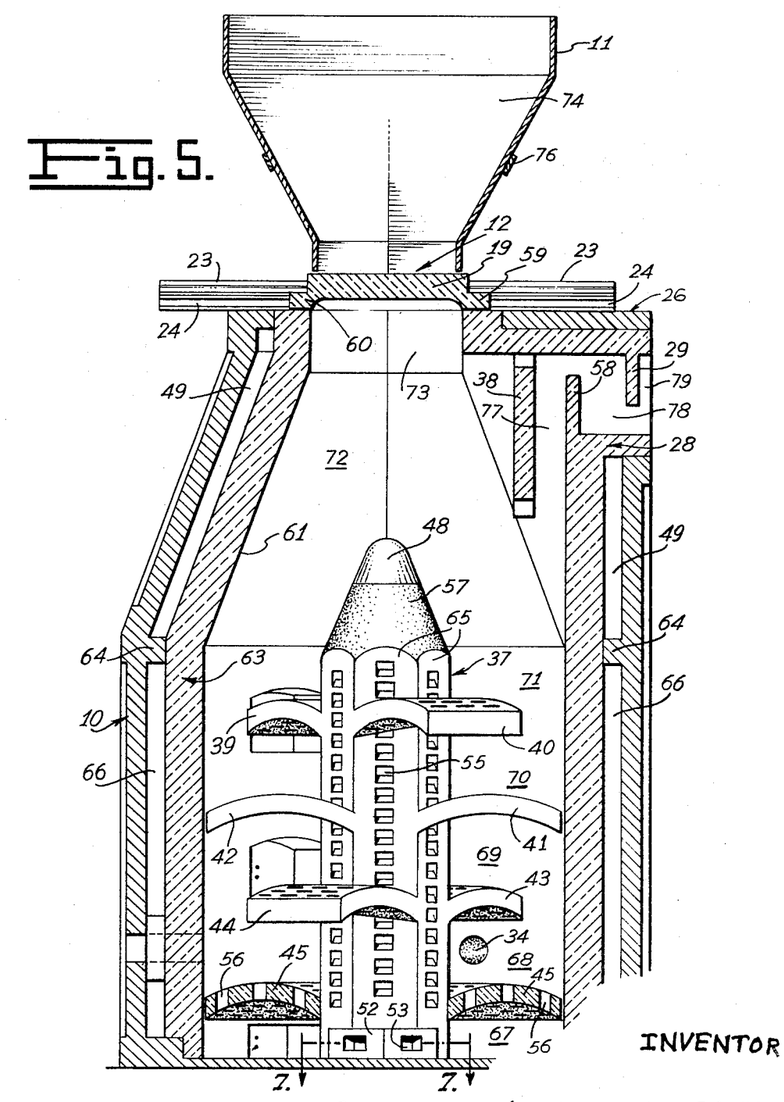
FIG. 5 is a cross sectional elevational view of the incinerator shown in FIG. 1, rotated at an angle of 90° with respect to said figure and showing all the inner details thereof.

In order to obtain a high combustion efficiency in the gases as well as in the garbage and wastes within the incinerator, it is preferred to divide the housing 10 into two portions, viz., a lower portion comprising straight walls 13 and an upper portion comprising inclined walls forming a taper upwardly of the incinerator, as illustrated at 14 in FIGS. 1 and 5 of the drawings. The upper section of the incinerator is provided with a ring 26 serving as a peripheral support and comprising, at one of the faces of the housing, a platform 35 for a purpose to be described later. Generally on the same side in which the platform 35 projects, a flue gases outlet duct 28 is arranged, provided with a plurality of baffles such as those indicated at 29 and 58 in FIGS. 1 and 5, in a staggered arrangement in order to provide a labyrinth for the outlet path of the gases and striking surfaces for the retention of the partially burned materials or heavy solids such as ashes which could have been entrained by the gas stream, so as to avoid the exhaustion of said partially burned materials or ashes through the chimney of the system.

The lower or straight section of the incinerator is provided with a plurality of doors such as doors 30, 31 and 32 which comprise handles 33 to open the same and stir the wastes on each one of the grates of the incinerator, or to extract ashes and all those waste materials which due to their non-combustible nature were not burned by the combustion gases of the incinerator in operation.

At the lower portion of the lower section of the incinerator, a plurality of bores 34 is provided, each bore directed in an approximately tangential direction with respect to the circumference circumscribed by the polygon formed by walls 13, and through each one of these bores the guns of special burners are introduced, with the guns being sufficiently long to pass through the whole length of the bore, in order to provide a whirling stream of combustion gases and flames, which will perfectly sweep the surface of the wastes, thereby achieving a high efficiency for the incineration thereof.

The platform 35 arranged as a continuation of ring 26 is provided with a pair of channels 36 (FIG. 2) longitudinally thereof, on which the guides 25 are inserted, provided in a door unit 12 such as shown in FIG. 1. The door unit 12 comprises a plate 20 having a front portion 59 and a rear portion 60 (FIG. 5), to firmly bear on the upper section of the incinerator and on the platform 35, said plate being a rectangular plate to perfectly seal all the sides of the upper opening of the device and being provided at its central portion with a vault 19 which curvature extends transversely of the motion of plate 12. Plate 12 is provided on each one of its sides with a plurality of brackets 21 having at their free ends wheels 22 mounted on rails 23 which in turn are mounted on beams 24 supported on the top 26 of the incinerator, to serve as a track to effect the motion of the platform 12 which can be moved along each side of the incinerator to open or close the upper mouth as will be described hereinafter.

On top of the incinerator there is provided a structure comprising vertical members 75 and horizontal members 76, said horizontal members 76 forming a supporting ring for a hopper 11 for the charging of garbage and wastes. Hopper 11 comprises an upper straight rectangular section 15, an hexagonal pyramidal intermediate section 16 and a lower hexagonal straight or outlet section 17 having a shape such that it will allow the free motion of the door 12, by clearing the vault 18 such as shown in FIG. 1 of the drawings. The waste-charging operation into the incinerator of the present invention, therefore, is carried out in a very simple way, since the only necessary operation is to discharge the wastes into hopper 11 to be retained on the vault 19 of plate 12 so that when this plate is moved to open the mouth of the device, the thus charged wastes will fall into the incinerator and will be evenly distributed, as will be described below, to be uniformly incinerated on the plurality of grates provided within the enclosure.

Figure 4:
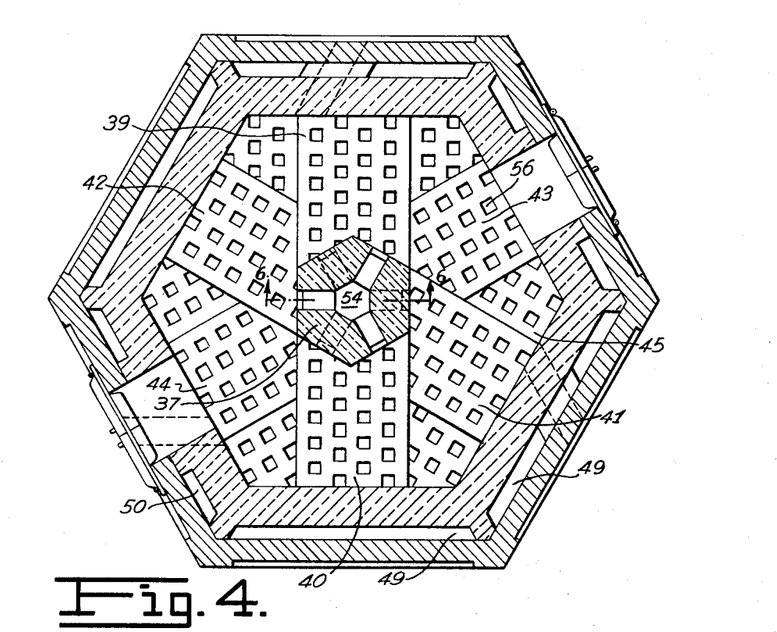
FIG. 4 is a cross sectional view of the incinerator of the invention, taken along lines 4—4 of FIG. 1 and looking in the direction of the arrows.

In accordance with FIGS. 4 and 5, the incinerator of the present invention is provided with an inner body 63 built with refractory walls in a shape similar to the above described enclosure or housing 10, concentrically arranged thereto and spaced inwardly of the inner portion of its walls, leaving an air gap which forms air chambers such as those shown at 49 and 66 (FIG. 5). The separation of the walls of the enclosures 10 and 63 is achieved by means of spacers 64 extending between both walls in suitable positions to structurally reinforce the enclosures. The air chambers 49 and 56 between both enclosures operate as cooling units for the device by providing openings through the walls of housing 10 adjacent the bottom and the top of chambers 49 and 56 in order to provide for an effective circulation by convection of the ambient air which provides for the efficient circulation of a cooling element capable of maintaining a suitable temperature on the walls of the inner enclosure 63, to thereby avoid the undue increase in the temperature values so as to avoid damage to the refractory materials of said walls.

At the center of the inner housing 63 and arranged at the axis thereof, a post 37 is provided which comprises an hexagonal pyramidal section formed by straight walls 65 and a blunt conical upper section 57 topped at its apex by means of a metal cap, which can be built of course of any other hard material, in the position indicated at 48. Along the straight walls 65 a plurality of vaulted grates 39 and 40, 41 and 42, 43 and 44, 45, are arranged such that the first six grates mentioned are arranged in diametrically opposite pairs and the latter has a circular shape and spans the whole cross sectional area of the incinerator. Said grates are distributed as shown in FIG. 4, so as to span all together the cross sectional area of the incinerator in order that, when the wastes dumped into hopper 11 fall through the upper mouth of the incinerator and strike on the blunt end of cap 38 of post 37, said wastes will be randomly distributed and fall on all and everyone of said grates with a uniform distribution and providing for a higher efficiency in the incineration of the wastes, due to the practical absence of localized accumulations thereof such as is the case when overlaying circular grates are charged through individual charging doors to form several combustion chambers.

In the particular case of the present invention, the efficiency of the load spreading device comprising the upper cone 57 of post 37 and the vaulted grates 39 and 44 inclusive, which are distributed at different angles with respect to a reference diameter of the enclosure, provides for the obtention of a very uniform distribution of load so that the need of stirring the load is very infrequent and still a complete combustion and incineration of the wastes introduced in the incinerator is obtained. In other words, when the wastes pass through the mouth 60 of the incinerator, most of them fall over the surface of cone 57 and cap 48, so that at least a portion of said wastes will fall on the upper grates 39 and 40, an additional portion will fall on grates 43 and 44, all of which are placed at different angles to each other, and the remaining wastes are finally retained by the circular grate 45 also of a vaulted form and arranged at the lower portion of the device, in order to avoid any amount of non-burned wastes to fall to the bottom of the incinerator with the consequent accumulation of non-incinerated materail therein. While on the lower grate 45 the material only falls at predetermined places which are visible from the top, as shown in FIG. 4, as the chamber above said grate 45 designated by the reference character 68 in FIG. 5, is the combustion chamber where the burners are placed, the material therein will be more energetically incinerated and, therefore, more satisfactorily burned. Also, it is in this chamber 68 where the inlets 34 for the burners are located, with the guns of the burners arranged in an approximately tangential arrangement, whereby in this chamber a very energetic whirling motion is caused, which tends to evenly distribute the garbage on the whole surface of the grate, 45, thereby also obtaining a highly efficient combustion thereof.

The primary air for the combustion of the wastes is received through bores 34 for the burners, and the secondary air through door 30 or equivalent, arranged at the lower chamber 67, which is placed under grate 45. The air passes through the openings 56 of grate 45, in order to complete the combustion of the wastes and, with the whirling motion produced by the burners introduced through the bores 34, the combustion gases thus formed sweep in a whirling-like manner over the garbage placed on the upper grates, while part of said combustion gases go through the openings 56 corresponding to each one of the grates, in order to achieve a complete and effective combustion of the wastes deposited thereon.

Figures 6, 7:
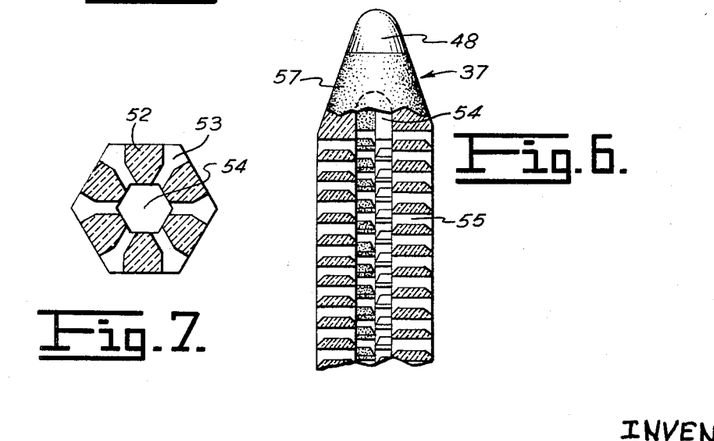
FIG. 6 is a fragmentary partially broken away elevational view of the central post for the distribution of garbage, showing the channels for the circulation of the cooling air, taken along lines 6—6 of FIG. 4 and looking in the direction of the arrows.
FIG. 7 is a cross sectional view of the lower element of the distribution post, taken along lines 7—7 of FIG. 5 and looking in the direction of the arrows.

Along the sides of walls 65 of post 37 for supporting the grates, there is arranged a plurality of windows 55 which can also be seen in more detail in FIG. 6 of the drawings, each of said windows being connected with a central duct 54 which extends the whole length of post 37 and which is fed with air through the openings 53 of the lower base 52 thereof, in order to feed the secondary air for combustion to the upper grates and to obtain a practically complete combustion of the garbage deposited thereon, while the central duct 54, jointly with the windows 55, upon effecting a draft effect over the air in chamber 67 of the incinerator, provides for a very efficient cooling effect for the central post which, otherwise, would be calcined in a short time and would need of the utilization of special refractory materials to avoid its disintegration because of the high temperature produced by the burners and the garbage in combustion.

The incinerator in accordance with the present invention, because of its particular and novel structure, provides in the interior thereof a plurality of chambers each serving for a specific and predetermined purpose in order to achieve a perfect incineration of the wastes introduced thereinto. Thus, chamber 67 under the grate 55 serves for the provision of secondary air for the combustion of the wastes charged, in order to achieve a complete combustion thereof. Chamber 68 is the combustion chamber where the burners producing the necessary heat are located in order to ignite the garbage and this chamber also receives the primary air for the burners so as to obtain a perfect combustion of the fuel. Chambers 69, 70 and 71 receive secondary air through the windows 55 of the central post 37 and in said chambers a complete sweeping action is effected over the garbage because of the whirling motion of the ascending combustion gases in order to obtain a complete incineration of the wastes on any of the above mentioned individual grates.

Chamber 72 above the central post 37 is the waste distribution chamber and the outlet for combustion gases and smoke. Chamber 73 is a neck serving for the feeding of garbage through the mouth of the device, and chamber 74 is the charging chamber of hopper 11 to receive the wastes from the exterior, such that all the incinerating operations be effected in a continuous and efficient manner.

Figure 8:
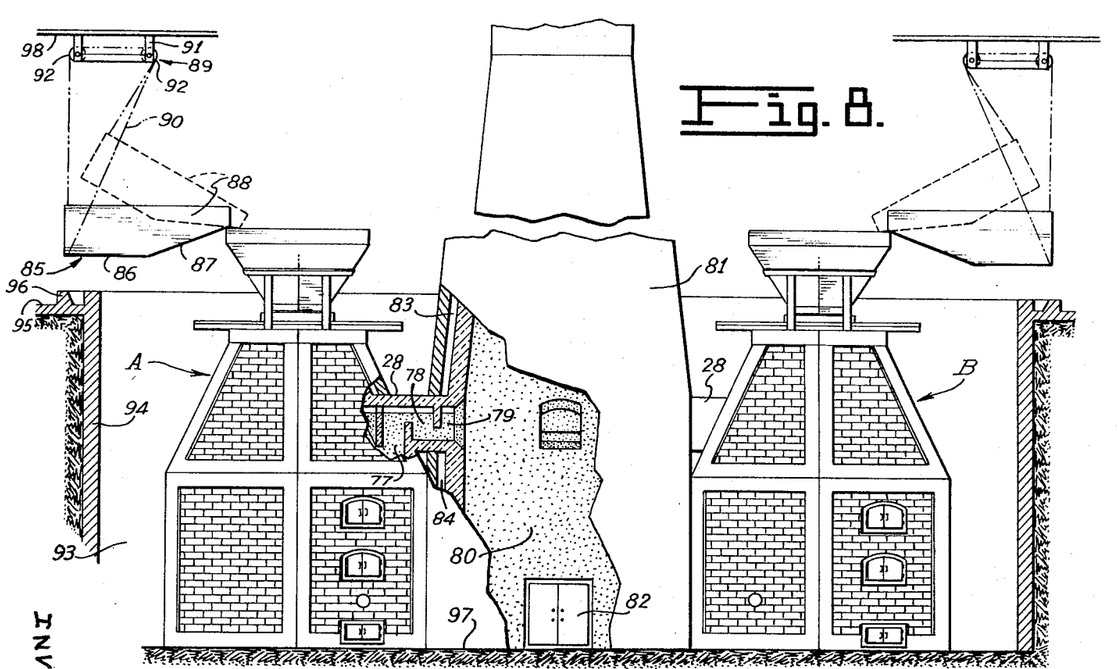
FIG. 8 is a fragmentary partially broken away elevational view of a battery of incinerators built in accordance with the invention, showing the details of the connection between the incinerators and the chimney as well as the charging system in its active and inactive positions.

The combustion gases flow up to chamber 72 and strike against the baffle 38 in order to separate therefrom an amount as high as possible of partially burned materials. Therefore, chamber 72 serves as a first gas cleaning chamber since in this chamber the partially burned materials, or at least the heaviest of these materials, are thrown back to be burned by the combustion gases acting through and over the grates. The gases leave through the passage or chamber 77 and flow toward a duct 28 which communicates with the chimney, said duct being provided, as mentioned above, with baffles 29 and 58 in order to form chambers 78 and 79 within which the gases strike against the corresponding baffles in order to deposit the partially burned materials and ash in said chambers. These partially burned materials and ash, after being deposited in the chambers of duct 28 are extracted through suitable doors. The combustion gases, as can be seen in FIG. 8 of the drawings, flow toward a plenum 80 of the chimney 81 where their speed is remarkably reduced so as to allow the deposition of all the fines entrained thereby. These fines are extracted through door 82 of the chimney and the gases flow out of the chimney 81 practically free of any solid material.

The chimney 81 comprises a double wall at its lower portion in order to form air chambers 83 and 84 having openings connecting to the atmosphere in order to provide a cooling action for the lower portion of the chimney which receives gas still at a considerably high temperature.

The charging device of the incinerators according to the present invention can vary but it is generally preferred to provide a charging device consisting of a loading bucket 85 comprising a rectangular flat portion 86 where the trucks discharge the garbage, an inclined or chute portion 87, and a mouth 88. These buckets can be arranged in an inclined position like a chute so that the garbage is directly discharged into hopper 11, or alternatively, they can be arranged horizontally such as illustrated in FIG. 8 and in this particular case each one is acted by a winch 89 comprising a plurality of pulleys 92 supported by means of hangers 91 from the roof 98 or from a suitable structure, and cables 90 acted by the pulleys, so that the bucket 85, after being loaded by the trucks, can be elevated to an inclined position to discharge the wastes into the incinerator.

It can be seen that an incinerator capable of incinerating extremely large amounts of wastes has been provided which, in view of its specific design and grate distribution, as well as the other elements of its structure, produces a highly efficient and complete combustion of the wastes, and a complete absence of partially burned materials and ashes tending to flow out of the chimney, so as to achieve a clean operation which will not constitute a nuisance and which will enable this type of incinerators to be installed within a closed building.

Figure 9:
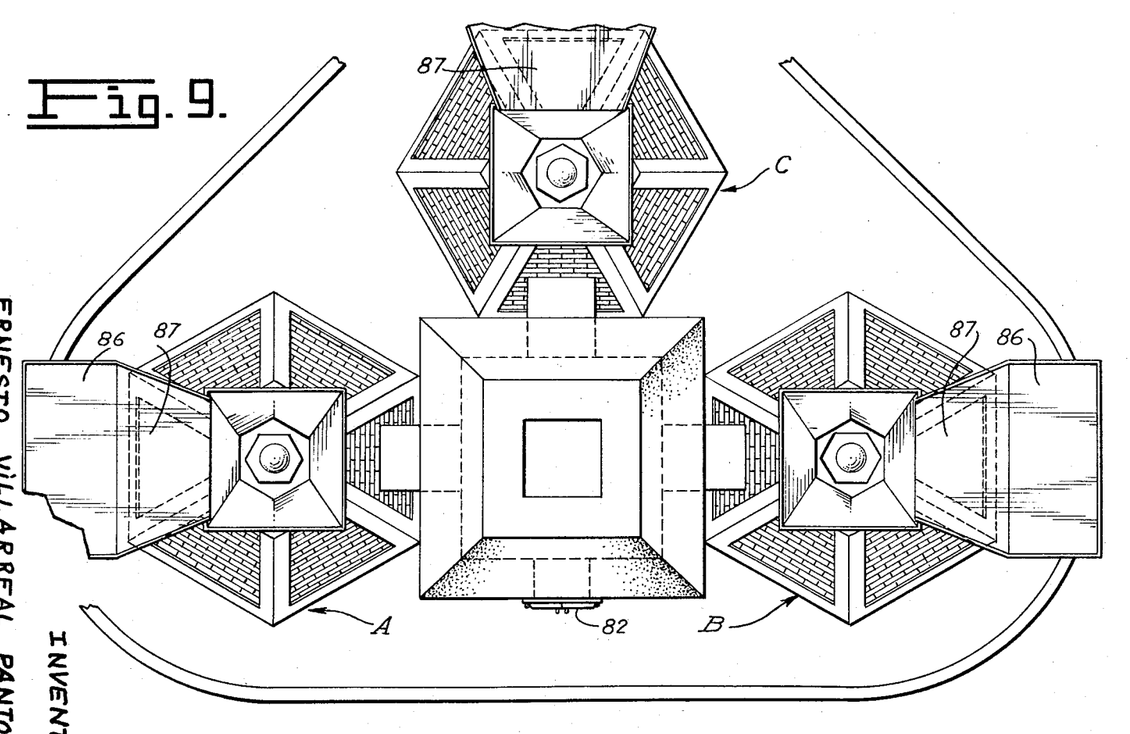
FIG. 9 is a top plan view of the battery of incinerators shown in FIG. 8.

The incinerators of the present invention, also, can be installed in batteries such as illustrated in FIGS. 8 and 9, in which a preferred embodiment of a battery formed with a plurality of said incinerators is shown connected to a common chimney.

In said figures three incinerators A, B and C are shown, built in strict accordance with the invention, each one provided with a charging implement 85 and each one connected by means of ducts 28 to a central chimney 81 and installed on the floor 97 of a well 93 which is provided with a side wall 94 such as of concrete in order to form an incinerator enclosure. This well can of course have the necessary ladders so that the operators can freely move to carry out the operation of the incinerators, to withdraw the ashes through the doors of the ducts and chimney and other important operations. A platform 95 for trucks is provided above the well and comprises a flat surface 95 and a stop 96 to fix the unloading position of the trucks and allow them to discharge the wastes into the buckets 85 which in turn discharge the wastes into the respective hoppers 11 of incinerators A, B and C. It will be obvious to anyone skilled in the art that these incinerators can also be arranged in a deeper well 93 whereby buckets 95 can be converted into mere chutes for the direct charging of the garbage into the hoppers 11, with the proviso that the latter be arranged at a lower level than the platforms 95 for trucks. This is within the skillfulness of any expert and it must be understood that this type of variations do not depart from the true scope of the application.

Although certain specific embodiments of the invention have been shown and described in the above, it is to be understood that many modifications thereof are possible. The invention, therefore, is not to be restricted except insofar as is necessitated by the prior art and by the spirit of the appended claims.

That which is claimed, as new, is:

1. An incinerator capable of developing a great capacity of incineration of wastes, which comprises an outer enclosure, an inner enclosure concentrically arranged within said outer enclosure and with its walls spaced from the walls of said outer enclosure by air chambers communicated at their lower and upper ends with the atmosphere to provide for the circulation by convection of cooling air streams; a charging mouth for wastes at the top of the inner enclosure; a slidable door on said mouth; a waste feed hopper above said slidable door; an axially arranged central vertical post having a polygonal cross section and a blunt conical section on top of said polygonal section, said post centrally supporting a plurality of grates extending at different levels thereof from diametrically opposite walls of said polygonal section toward the walls of said inner enclosure, said grates being angularly arranged to each other from one level to the next in order to cover as much as possible of the cross sectional area of the inner housing, and at least one of said grates being arranged under the remaining grates and spanning the whole cross sectional area of the inner enclosure; means for circulating air for cooling and for effecting a secondary combustion through said post; an outlet duct for flue gases extending laterally of the outer housing on the upper portion thereof, said duct being provided with a plurality of staggered vertical baffles which form impact surfaces for the gases leaving the device and for depositing on the bottom of the duct any non-gaseous materials which can be entrained by the combustion gases; a vertical baffle supported from the roof of the enclosure at a short distance from the outlet duct for gases, in order to constitute another impact surface to thereby stop all types of partially burned materials entrained by the gases; and a plurality of bores tangentially extending through the walls of said outer and inner housings, to accommodate the guns of a corresponding plurality of fuel burners at a distance above the circular lower crate so as to create a whirling motion of the gases to perfectly sweep over the wastes on the grates.

2. An incinerator according to claim 1, wherein said grates extending between the central post and the wall of the inner enclosure are vaulted grates supported at one end on one of the faces of the central post and at the other end on the inner surfaces of the walls of the inner enclosure.

3. An incinerator according to claim 1, wherein the central vertical post is provided with a hollow axial bore communicated at its lower end with a fresh air feeding member comprising a plurality of openings extending radially outwardly in a star-like pattern under the lower circular grate of the incinerator, said axial bore being communicated at different levels of the post through openings extending radially outwardly throughout the height of the post and communicating with the different chambers of the incinerator through ventilating windows on each one of the faces of the polygonal section of the post.

4. An incinerator according to claim 1, wherein said central post is provided, on its blunt conical upper section, with a metal cap having a complementary form in order to serve as a spreader to randomly distribute the wastes falling thereon down the mouth of the incinerator and to uniformly spread said materials throughout the grates of the device.

5. An incinerator according to claim 1, wherein the charging mouth of the incinerator is located on top of a pyramidal section of the housings, and the slidable door comprises a vaulted plate with a sealing rectangular frame, which comprises a plurality of ribs accommodated in channels correspondingly arranged on the top of the incinerator so as to form a track guide for the slidable movement of the door, a plurality of rolls attached to said vaulted plate, and rails correspondingly arranged at the upper portion of the incinerator, in order to facilitate the movement of the door and therefore the opening and closing of the charging mouth of the incinerator.

6. An incinerator according to claim 1, wherein the feed hopper above said slidable door is provided with charging means for receiving entire truck-loads of wastes and lead them toward the mouth of the incinerator.

7. An incinerator according to claim 6, wherein said charging means comprises a bucket movable between a first horizontal position and a second inclined position by the action of a winch, said bucket being arranged such that its outlet will be overlapped over the upper edge of the feed hopper and such that its reception end in the horizontal position of the bucket will lay at a predetermined height over a charging platform to receive a complete dump-truck-load, said platform being provided with stops to fix the position of the truck at the reception end of the bucket.

8. An incinerator according to claim 1, wherein the outlet duct thereof is connected to a chimney, the latter being capable of receiving a plurality of said ducts from a corresponding plurality of incinerators, said chimney comprising a double walled lower section with air chambers between said walls communicated with the ambient air at their lower and upper ends to provide for the circulation of cooling air streams by convection, a door for cleaning and discharging the ash accumulated, and a single walled upper section of a height sufficient to produce a suitable draft.

9. The incinerator of claim 8 in combination with other incinerators connected to a common chimney, wherein said incinerators are arranged at the bottom of a well sufficiently deep to provide for the arrangement of fixed charging chutes at a suitable level for receiving waste from the trucks carrying it to the incinerating plant.

References Cited

UNITED STATES PATENTS

| | | | |
|---|---|---|---|
| 490,582 | 1/1893 | McClave | 110—8 |
| 952,651 | 3/1910 | Thompson | 110—17 X |
| 1,842,277 | 1/1932 | Mattekovich | 110—12 |
| 2,215,721 | 8/1938 | Hartley et al. | 110—12 |
| 3,329,141 | 7/1967 | McClure | 110—18 X |

JAMES W. WESTHAVER, *Primary Examiner.*